(12) United States Patent
Miller et al.

(10) Patent No.: US 7,987,578 B2
(45) Date of Patent: Aug. 2, 2011

(54) METHOD OF MOLDING AND ASSEMBLING A CONTAINER WITH HINGED LIDS

(75) Inventors: Daniel R. Miller, Cincinnati, OH (US); Roy B. Luther, Brookfield, WI (US)

(73) Assignees: Buckhorn, Inc., Milford, OH (US); Triangle Tool Corporation, Milwaukee, WI (US)

( * ) Notice: Subject to any disclaimer, the term of this patent is extended or adjusted under 35 U.S.C. 154(b) by 248 days.

(21) Appl. No.: 12/230,213

(22) Filed: Aug. 26, 2008

(65) Prior Publication Data
US 2008/0314917 A1 Dec. 25, 2008

Related U.S. Application Data

(62) Division of application No. 11/252,622, filed on Oct. 19, 2005, now Pat. No. 7,841,487.

(60) Provisional application No. 60/623,229, filed on Nov. 1, 2004.

(51) Int. Cl.
*B23P 11/02* (2006.01)

(52) U.S. Cl. ........ 29/453; 29/455.1; 29/527.1; 220/826; 264/238

(58) Field of Classification Search ................. 29/527.1, 29/453, 455.1; 220/826; 264/238
See application file for complete search history.

(56) References Cited

U.S. PATENT DOCUMENTS

| | | | |
|---|---|---|---|
| 3,463,345 A | | 8/1969 | Bockenstette |
| 3,477,095 A | * | 11/1969 | Lensky .......................... 425/317 |
| 3,902,628 A | | 9/1975 | Schurman |
| 4,364,489 A | * | 12/1982 | Alexeeff ........................ 220/826 |
| 4,432,467 A | | 2/1984 | Swingly, Jr. |
| 4,549,670 A | | 10/1985 | Trendler |
| 5,353,948 A | * | 10/1994 | Lanoue et al. ................. 220/826 |
| 5,555,996 A | | 9/1996 | Lang-Ree et al. |
| 5,887,744 A | | 3/1999 | Mejias |
| 6,050,442 A | * | 4/2000 | Wysocki ........................ 220/524 |
| 6,186,350 B1 | | 2/2001 | Barrier et al. |

(Continued)

FOREIGN PATENT DOCUMENTS

EP   1245371 A1   10/2002

(Continued)

OTHER PUBLICATIONS

XP-002366827, WPI/Derwent (abstract), 2 pages.

*Primary Examiner* — David P Bryant
*Assistant Examiner* — Bayan Salone
(74) *Attorney, Agent, or Firm* — Mattingly & Malur, P.C.

(57) ABSTRACT

An attached lid container has lids that are hinged to the top edges of the side walls of the container. When the lids are closed, the free edges of the lids engage one another to form a joint that interlocks the lids together. The lids are attached to the container at the hinge joints after the molding of the container and lids, while the molded parts are still in the mold press. Specifically, the lids are molded next to the container and then moved laterally to be aligned with the hinge line of the container after the mold cavity is withdrawn. Then, the ejectors push the lids out toward the container. The force of the outward movement causes the hinge parts of the lids and container to snap together. Subsequently a robot arm removes the container from the mold press with the hinged lids assembled on the container.

3 Claims, 18 Drawing Sheets

U.S. PATENT DOCUMENTS

| | | |
|---|---|---|
| 6,234,782 B1 | 5/2001 | Hansen |
| 6,263,543 B1 * | 7/2001 | Daoud .......................... 16/342 |
| 6,918,508 B2 | 7/2005 | Hwang |
| 7,841,487 B2 * | 11/2010 | Miller et al. ................. 220/826 |
| 2002/0178560 A1 * | 12/2002 | Cardona .......................... 29/11 |
| 2004/0118716 A1 * | 6/2004 | Watson et al. ............. 206/308.1 |
| 2004/0144793 A1 | 7/2004 | Lessard et al. |

FOREIGN PATENT DOCUMENTS

| | | |
|---|---|---|
| WO | WO 93/13927 | 7/1993 |
| WO | WO 93/18975 | 9/1993 |
| WO | WO 00/21737 | 4/2000 |

* cited by examiner

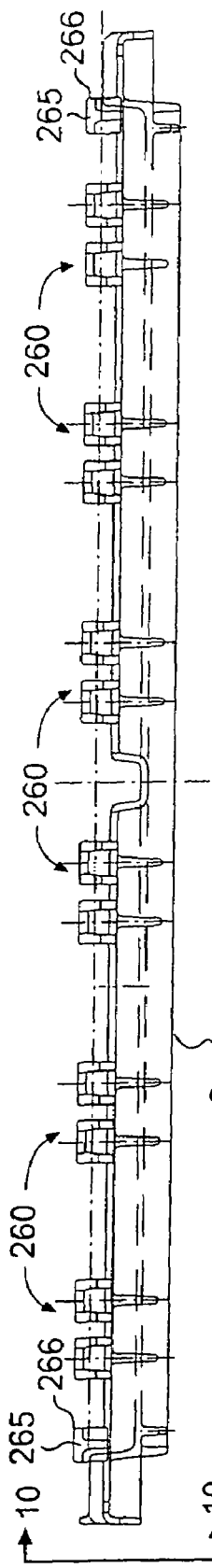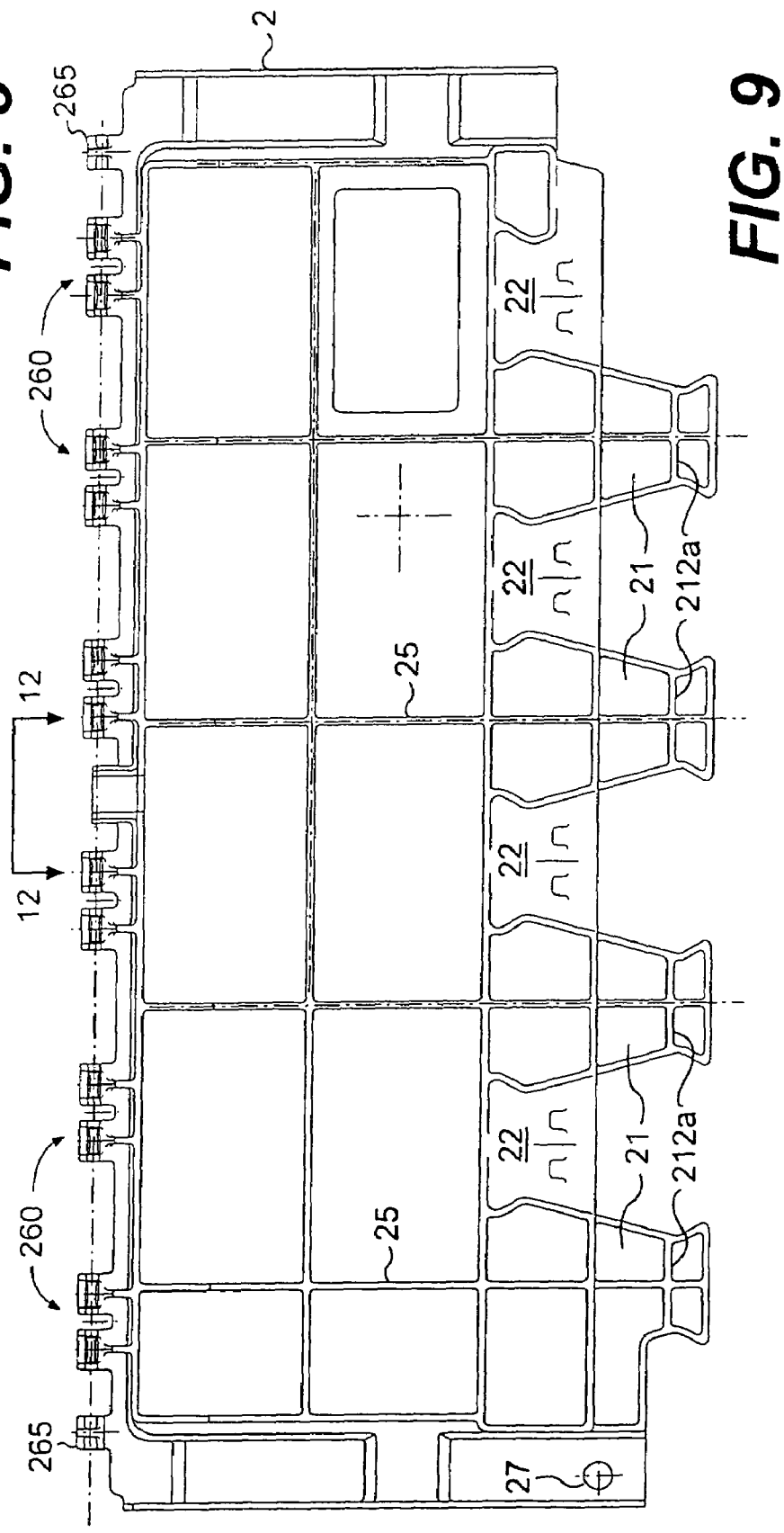

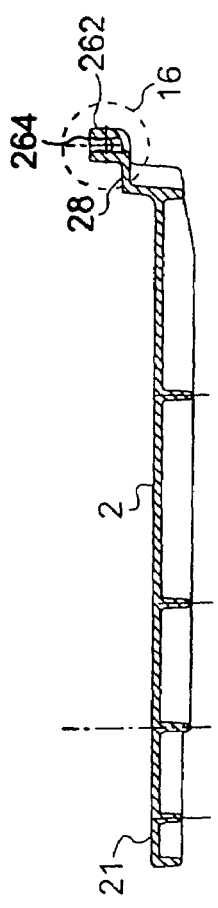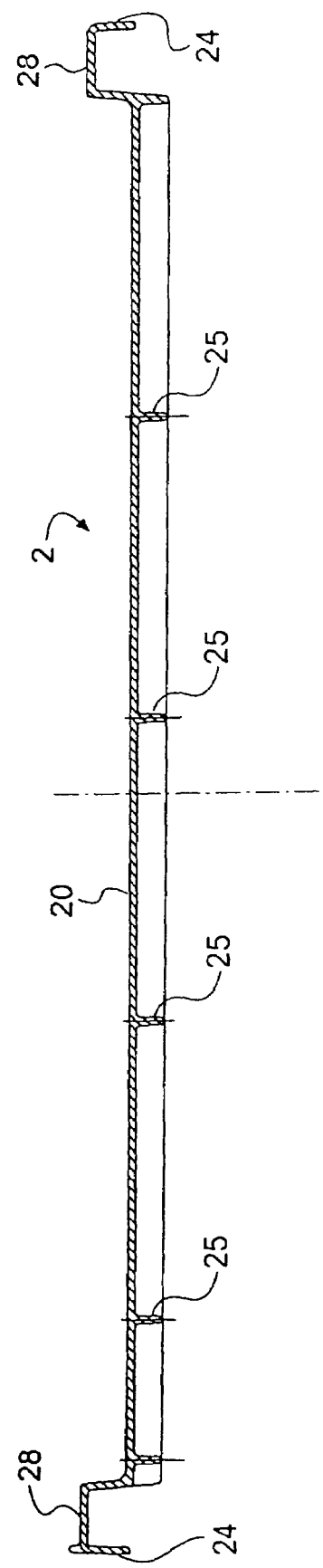
FIG. 14
FIG. 15

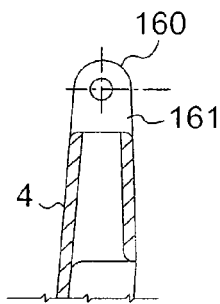
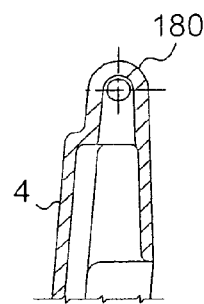
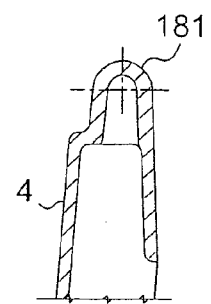
FIG. 20   FIG. 21   FIG. 22
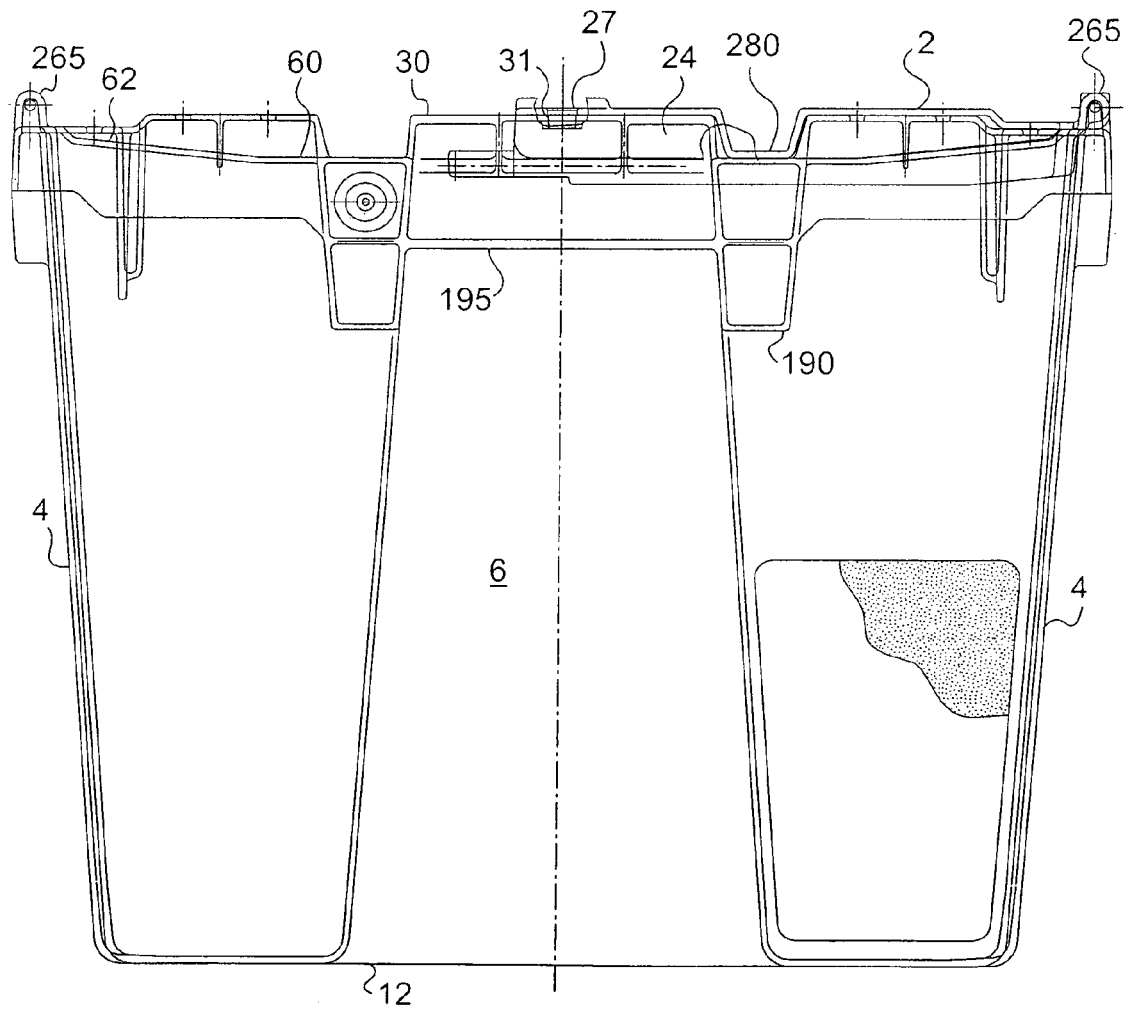
FIG. 23

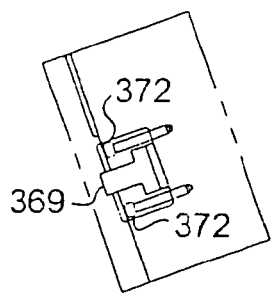
FIG. 26C
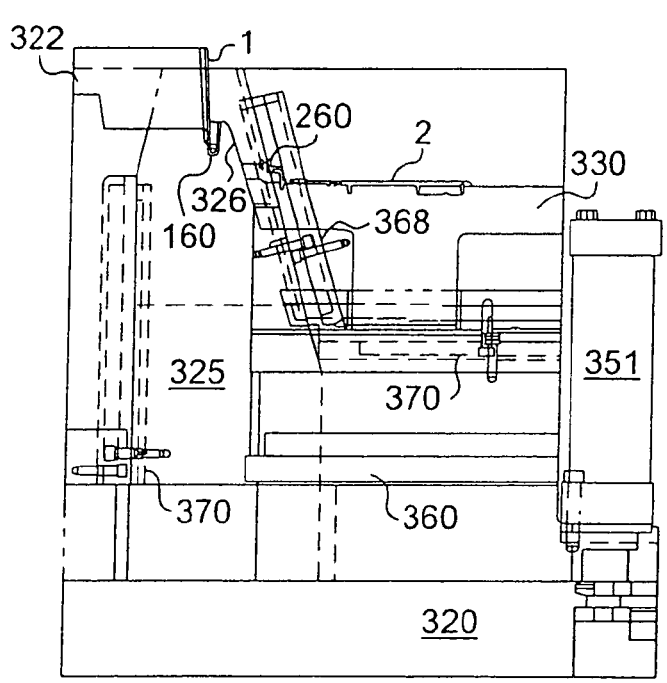
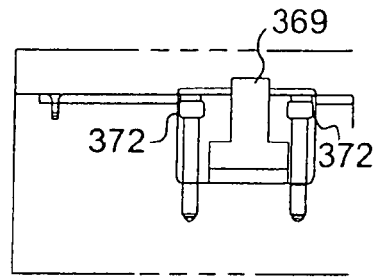
FIG. 26D
FIG. 26A
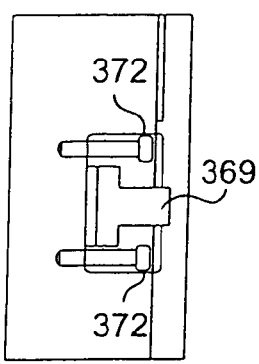
FIG. 26B

METHOD OF MOLDING AND ASSEMBLING A CONTAINER WITH HINGED LIDS

RELATED APPLICATIONS

This application is a divisional application of U.S. patent application Ser. No. 11/252,622, filed Oct. 19, 2005, now U.S. Pat. No. 7,841,487, which claims the benefit of U.S. Provisional Patent Application No. 60/623,229, filed Nov. 1, 2004, the contents of which are hereby incorporated by reference into this application.

BACKGROUND OF THE INVENTION

1. Field of the Invention

The invention relates to a container having hinged lids that are able to be snap fit onto the container, and to a method of molding and assembling a hinged lid container in which the lids are molded at the same time as the container and are assembled onto the container as the container and lids are ejected from the mold cores in the molding process.

2. Description of Related Art

Stackable and nestable hinged lid containers or totes are well known and widely used. Half lids extend across the open top of the container and close in engagement with one another so that containers can be stacked on top of each other with the bottom wall of an upper container resting on the closed lids of the lower container. The containers can also be arranged in a nested stack when the lids are open and hang down along each side of the container. An example of a hinged lid container is shown in Bockenstette, U.S. Pat. No. 3,463,345, which is hereby incorporated by reference.

The half lids are hinged to the container along hinge lines at the top of each side wall of the container and are capable of rotating through approximately 270°. The hinge is formed from parts that are molded into the top of the container side wall and along the lid edges. In one example, the hinge parts form alternating recesses on the lids and container wall that capture a hinge pin that is manually inserted in the final assembly step. In another example, the hinge parts on the container are molded as pin segments and, on the lids, tubular shaped hinge knuckles are molded. The respective knuckle segments on the lids are assembled on the pin members on the container to form the hinge. In both cases, assembly of the hinge joint requires the lids to be manually assembled onto the container, for example by sliding the hinge pin in place and securing the ends of the pin or snap fitting or press fitting the knuckle segments of the lids onto the pin members of the container.

Part of the final cost of the hinged lid containers of the prior art reflects the costs associated with the manual labor required for assembly of the lids on the containers. This is a disadvantage since the molding of container and lids can otherwise be performed without manual assistance since a robot arm can be used to withdraw the molded parts from the mold core at the conclusion of the molding process.

SUMMARY OF THE INVENTION

According to the present invention, a container having at least one hinged lid is provided in which each lid is able to be snap fit onto the top edge of a corresponding sidewall of the container, and the hinge parts are molded as part of each lid and container side wall, respectively.

Further, according to the present invention, a container is molded together with at least one lid part and each lid part is fit onto the top edge of the container sidewall as the container and respective lid parts are ejected from the mold cores in the molding process.

In more detail, a container is provided having a bottom and two pair of opposed walls connected together to form a container body having an open top, with the open top covered by a lid. At least one upper edge of one of the walls has a plurality of pin segments formed thereon and an edge of the lid has a plurality of generally U-shaped knuckles formed thereon. Each knuckle has a slot which opens upwardly with respect to a top surface of the lid, whereby when the lid is mounted to the container body and covers the open top thereof, the pin segments are engaged in the slots to form a rotatable hinged connection between the container body and the lid and slots face outwardly in a direction away from the top surface of the lid.

In another embodiment of the invention, two lid halves are provided with each lid half being hingedly connected to an upper edge of one of the side walls of the container.

The present invention also provides a method of molding and assembling a container having a lid connected thereto which includes injecting a molten plastic liquid into a mold to form a container body having an open top and to also form at least one lid situated adjacent one edge of the open top of the container in the mold. The one edge of the container body is formed with connecting parts along a length thereof and the lid also is formed with connecting parts along an edge thereof. The method further includes opening the mold by separating a mold cavity portion from a mold core portion so that the container body and the lid are supported by the mold core portion. A first part of the mold core portion is then moved so that the connecting parts on the lid are aligned with the connecting parts on the one edge of container body and then a second part of the mold core portion is moved so that one of the lid and the container body moves towards the other of the lid in the container body until the connecting parts on the lid are engaged with the connecting parts on the one edge of the container body to connect the lid to the container body.

The method further may include injection a molten plastic liquid into a mold to form a container body having an open top and to form a lid adjacent each of two opposite edges of the open top with each of the opposite edges being formed with hinged parts along a length thereof and each of the lids being formed with hinged parts along an edge thereof. The method further includes opening the mold by separating a mold cavity portion from a mold core portion so that the container body and the lids are supported only by the mold core portion and then moving a first part of the mold core portions, so that the hinged parts of each lid are aligned with the hinged parts on one of the opposite edges of the open top and then moving a second part of the mold core portion so that either the lids or the container body moved towards the other of the lids or the container body until the hinged parts and each lid are engaged with the hinged parts on one of the opposite edges of the container body to rotatably connect the lids to the container body.

The present invention further includes a method of molding and automatically assembling two elements together to connect the elements to each other which includes injecting a molten plastic liquid into a mold to form two separate elements spaced from each other with each of the elements being formed with connecting portions along an edge thereof. The method further includes opening the mold by separating a mold cavity portion of the mold from a mold core portion, so that both of the elements are supported by the mold core portion and then moving a first part of the mold core portion so that the connecting parts on the edge of one element are aligned with the connecting parts on the edge of the other element. Subsequently, a second part of the mold core portion is moved so that one of the elements moves towards the other of the elements until the connecting parts of the two elements are engaged by being snap fitted together.

In connection with the method of molding and automatically assembling two elements, the connecting parts on one element are pin segments and the connecting parts on the other element are generally U-shaped knuckles having a slot which opens outwardly with respect to an outer surface of the other element whereby when the connecting parts of the two elements are engaged, the pin segments are captured and held in the slots of the knuckles.

BRIEF DESCRIPTION OF THE DRAWINGS

FIG. 8 is a side view of the lid shown in FIG. 7.

FIG. 9 is a bottom view of the lid shown in FIG. 7.

FIG. 14 is a sectional view taken along line 14-14 shown in FIG. 7.

FIG. 15 is a sectional view taken along line 15-15 shown in FIG. 7.

FIG. 20 is a sectional view taken along line 20-20 shown in FIG. 19.

FIG. 21 is a sectional view taken along line 21-21 shown in FIG. 19.

FIG. 22 is a sectional view taken along line 22-22 shown in FIG. 19.

FIG. 23 is an end view of the container shown in FIG. 18 with a lid shown in the closed position in the right half of the figure, the other end view being substantially similar.

FIG. 26A is an end view of the mold tool for molding the container and lids of FIG. 1 showing the details of mounting of the lid core plates for movement, after the molding of the container and lids.

FIGS. 26B-26D show partial end views of the core side movement guides of the container and lids mold shown in FIG. 26A.

DETAILED DESCRIPTION OF THE PREFERRED EMBODIMENTS

Figure 1:
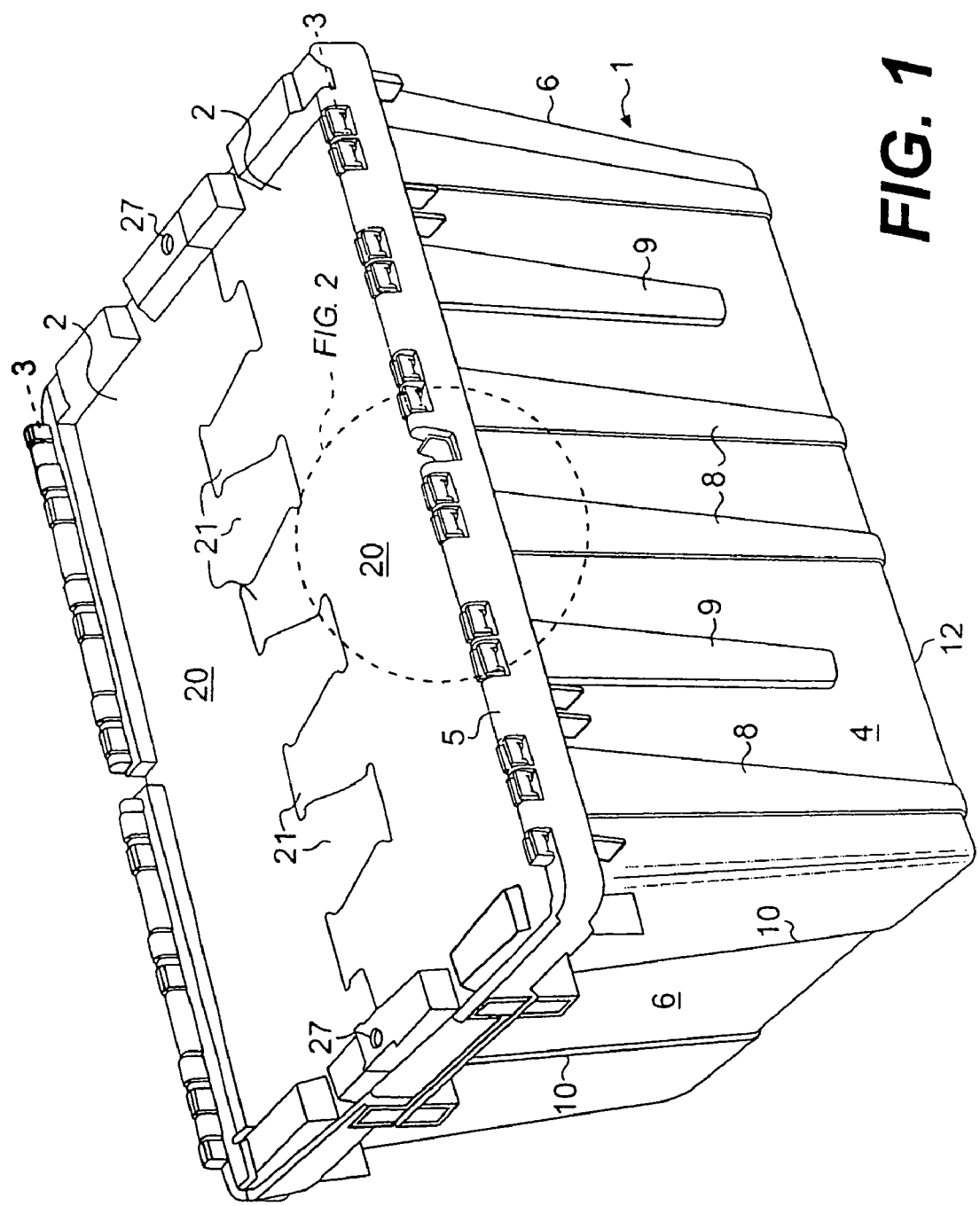
FIG. 1 is a perspective view of a container with two hinged lids (half lids) constructed according to a preferred embodiment of the invention, with the lids shown in the closed position.

The container 1, as shown in FIG. 1, constructed according to a preferred embodiment of the invention, has hinged lids or lid halves 2 that are each joined to a container sidewall along a hinge axes 3. The two lid halves from a cover for the container. Each lid half 2 shown in the figure is the same as the other, only in mirror image as assembled on the container with respect to each other. The container has a pair of opposed side walls 4 to which lids 2 are joined through the hinges along the top edge of the side walls. The container also has a pair of opposed end walls 6 and a bottom wall 12. The bottom, side and end walls are connected together to form a container body having an open top covered by the lids where the lids are closed.

The lids rotate about hinge axis 3 to an open position (not shown) wherein the lids hang down along side walls 4 after being rotated approximately 270°. With the lids in the open position, the containers can be nested within one another for transporting nested stacks of empty containers.

The side walls of the container are reinforced by ribbing, generally designated as vertical corrugation ribs 8 and 9. On the end walls 6, are strengthening ribs 10, similar to the vertical corrugations 8 and 9 that are angled to permit nesting of empty containers.

When the containers are to be stacked, rather than nested, the lids are rotated to their closed position. The bottom wall 12 of an upper container is stacked on a lower container and is supported by a mid portion 20 of the lids. Several of the containers may be stacked on one another, and a substantial load can be placed on the lids of a bottom most container in the stack. The joint between the lids is interlocked by structure that includes one or more fingers 21 that extend outwardly from the mid portion 20 of the lid in combination with recesses or pockets 22 (FIG. 7) extending between the fingers 21. As also shown in FIG. 7, the free edge or side edge 23 of lid 2 is substantially coincident with the center line of the opening of the container so that edges 23 of each of the facing lids abut one another when the lids are in their closed position.

Figure 7:
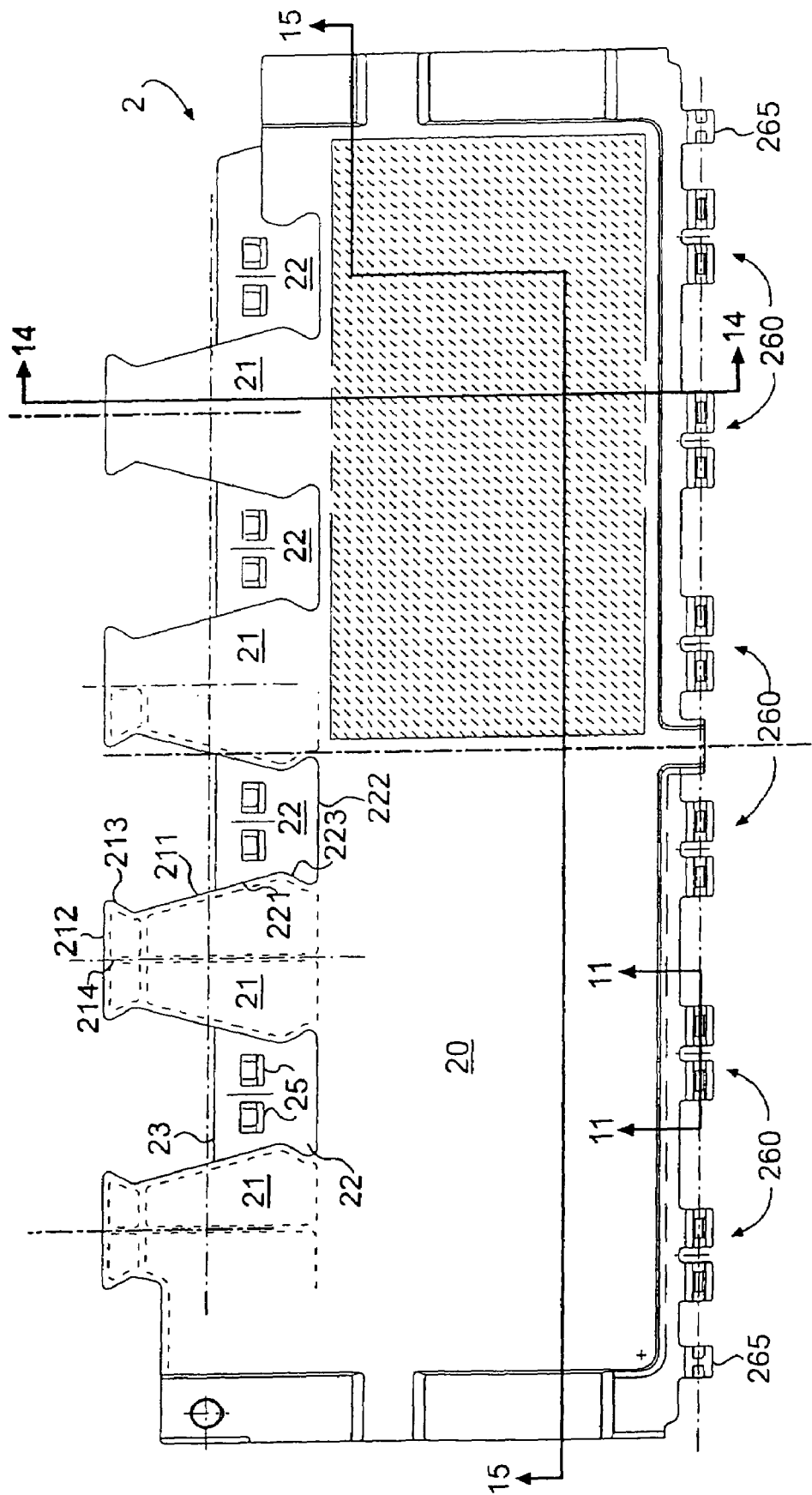
FIG. 7 is a plan view of one lid shown in FIG. 1, with the other lid being identical.

As shown in FIG. 7, the lid is provided with closure structure as disclosed in U.S. Pat. No. 4,364,489, which is hereby incorporated by reference. The closure structure includes fingers 21 that are generally tapered (within a range between 30° and 45°) and defined by side edges 211 terminating in an end 212. For reinforcement, the side edges are ribbed from the underside of the lid, as shown in FIGS. 9 and 14 and by dashed lines in FIG. 7. At ends 212 of the fingers is part of an interlock structure, provided on the lids, which comprises oppositely tapered wedge-shaped side edge portions 213 that together form oppositely tapered end wedge portions 214 that are tapered in the opposite direction with respect to the taper of side edges 211. Stated alternatively, the wedge shape is created by the side edge portions 213 being cut back with respect to the tapering of the side edges 211, which otherwise would continue to converge toward one another.

The other part of the interlocking structure is provided along the side edges 221 of the pockets 22. In particular, side edges 221 V-inwardly toward one another in the direction extending toward the pocket end wall 222, except for side edge portions 223 that flare outwardly to form a pocket that receives the end wedge portion 214 of the fingers. In this way, the fingers 21 are prevented from being pulled away from the pockets 22 by a force tending to separate the joint between the lids that might result from a stacking load placed on the recessed portion 20 of the lids.

Additionally, as shown in FIG. 7, upstanding ribs or protrusions 25 are provided within pockets 22. Ribs or protrusions 25 are optional and are provided to abut the inner wall portion 212a (FIG. 9) of the rib forming ends 212 of the fingers. Further, ribs 25 are provided throughout the lids for strengthening, as shown in FIG. 9.

Figure 10:
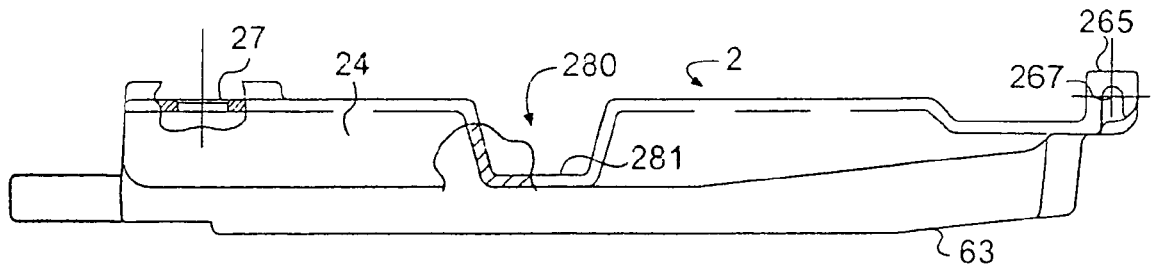
FIG. 10 is an end view taken in the direction of the arrows 10-10 shown in FIG. 8.

As shown in FIGS. 1 and 23, the container has upper end wall flanges 30 that extend adjacent at least one side of the lids. Each of the flanges 30 has an aperture 31. As shown in FIG. 15, which is a sectional view taken along line 15-15 in FIG. 7, the lid has a return flange 24. An aperture 27 is formed in the return flange 24 of the lid, as shown in FIG. 10. When the lids are closed, the aperture 27 in the return flange 24 aligns with the aperture 31 of the upper end wall flange 30 to permit a security tie to be passed therethrough, as shown in FIG. 23. Since the flanges supporting the security tie apertures 27, 31 extend vertically, and not horizontally, a critical outer dimension of the container can be maintained without interference from the security ties structure.

Figure 17:
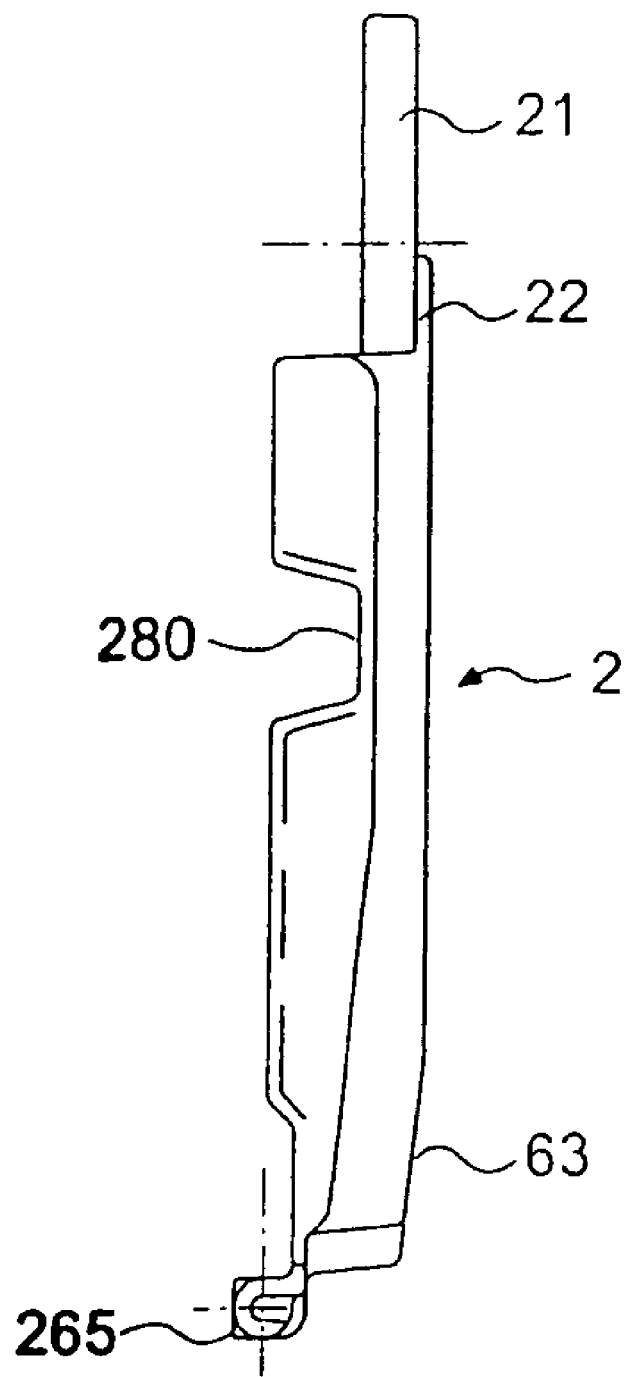
FIG. 17 is an end view taken from the right end of FIG. 7.

In FIG. 23, the lid 2 is shown in a closed position, although only one lid is shown. The return flange 24 of the lid is tapered in the direction toward the hinge axis, and it engages a top edge 60 of the end wall in the closed position. Top edge 60 has a mid portion 61 that is generally parallel to the bottom wall 12 of the container. Extending toward the side walls 4, however, top edge 60 slopes upwardly along a portion 62 that corresponds in slope to the taper of the return flange 24 of the lid 2. The return flange 24, as well as other longitudinally and transversely extending ribs underlying the lid (63, generally, as shown in FIGS. 10 and 17) are reduced in height in a direction extending towards the side walls of the lid. This reduction in rib height and tapering of the return flange reduces the lid flare of shingled lids of a plurality of containers nested together with their lids overlying one another. In the closed position, the sloped portion 62 of the top edge of the end walls, as shown in FIG. 23, supports the similarly tapered return flanges 24 of the lids to reinforce the periphery of the mid portion 20 of the lids.

Although the preferred embodiment of the invention shown in FIG. 1 contemplates the interlocking structure as comprising three projecting fingers 21 and three corresponding pockets 22, the number of fingers and corresponding pockets can be increased depending upon the overall dimensions of the container and the specific applications to which the attached lid container will be put in use.

Figure 2:
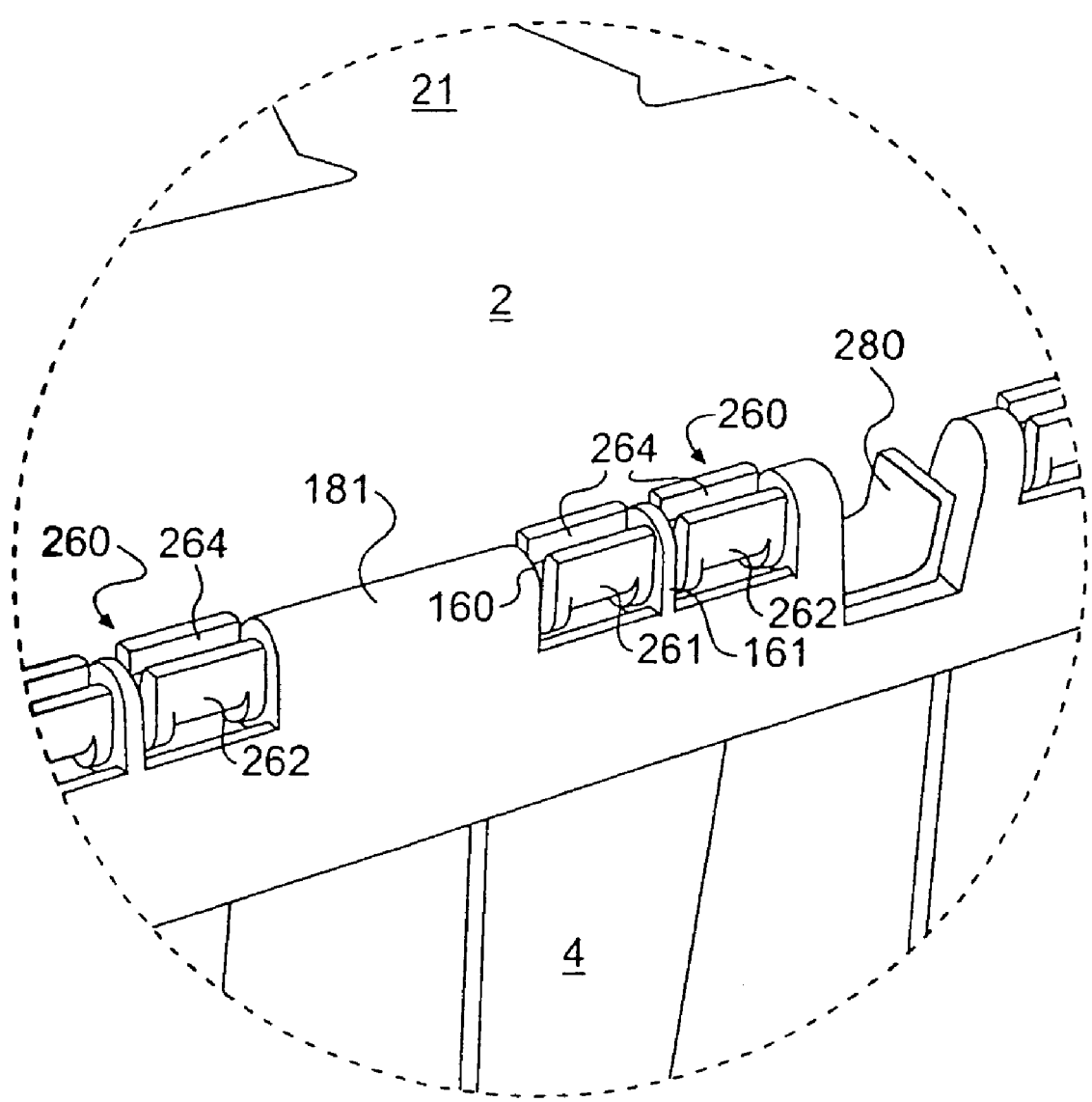
FIG. 2 shows the detail of the hinge joint in the area shown in FIG. 1.
Figure 16:
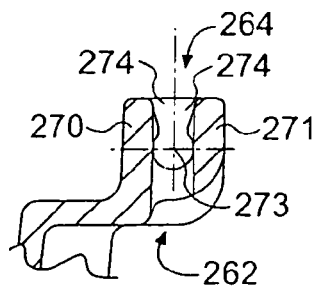
FIG. 16 shows the detail of the hinge joint part in the area indicated by 16 in FIG. 14.

In FIG. 2, a part of the hinge joint between the lids 2 and the container 1 is shown. The hinge parts include arcuate shaped knuckles 260 molded as part of the lid 2 that open upwardly, with respect to the closed position that is shown in FIGS. 1 and 2. Also, molded to extend upwardly from along the top edge 5 of the container side walls are pin segments 160 (FIGS. 18, 20 and 24) that are received within the openings 264 of the knuckles (FIGS. 13 and 16) when the lid—container hinge joints are formed at the conclusion of the molding process. The molding process is shown in sequence in FIGS. 3-6.

Figure 3:
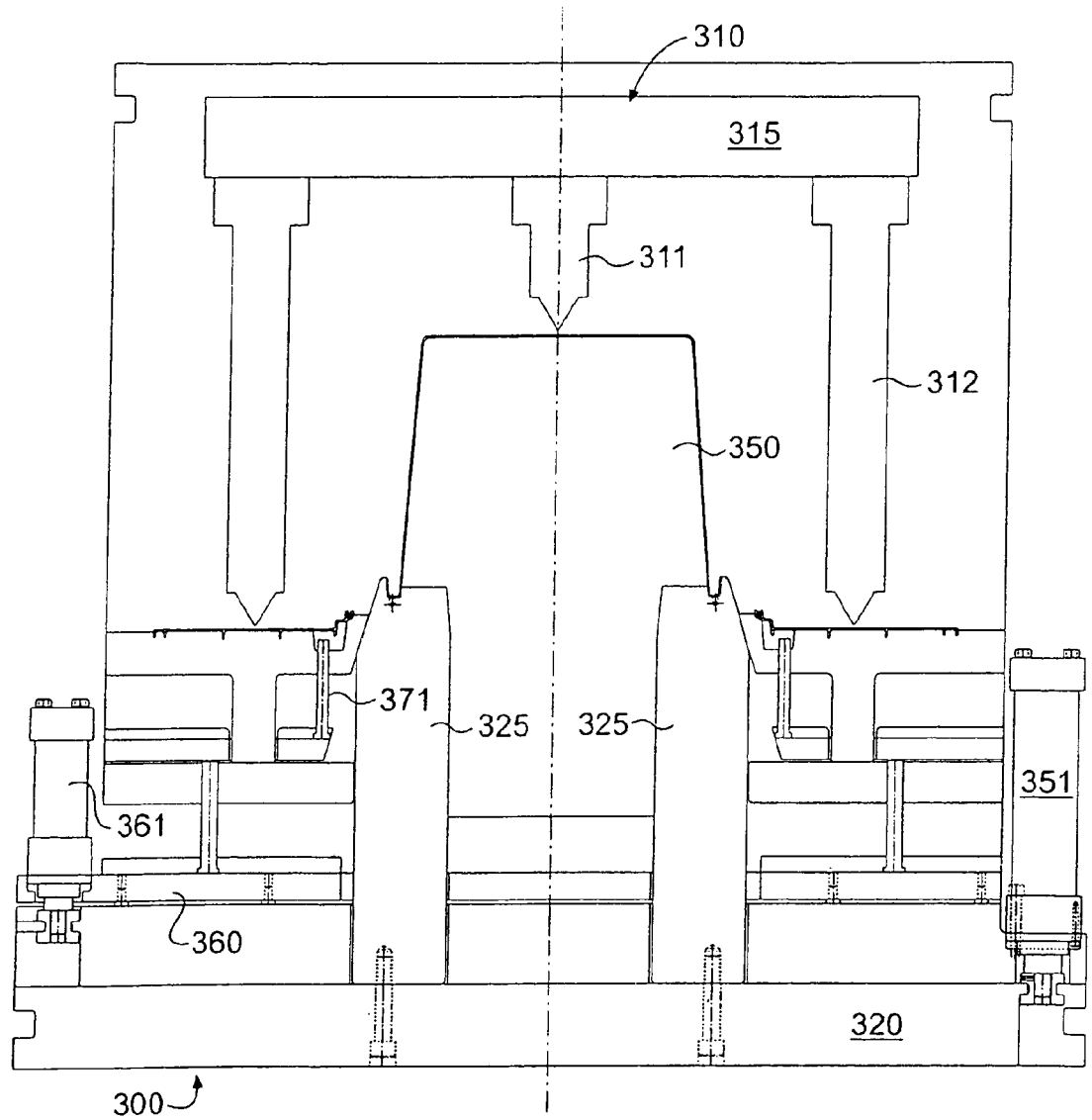
FIG. 3 is a sectional view through the width of the mold tool for molding the container and lids of FIG. 1 showing the core and cavity in the closed position for molding the container and lids.

FIG. 3 shows a sectional view through the width of the mold 300 for the molding and assembling the container 1 with hinged lids 2, constructed according to a preferred embodiment of the invention and shown in FIG. 1. The mold is shown in FIGS. 3-6 in a simplified manner to illustrate the sequence of the molding process that is a part of the present invention. Additional details of the mold are well known, including the mold press details and plastic injection molding supply. For example, the melt flow system 310 shown in FIGS. 3-6 is shown schematically, and includes the injector 311 for the container part and injectors 312 for the lid parts of the mold which are supplied by a common manifold 315 that receives a continuous supply of melt from a heater that draws in pellets or beads of plastic from a suitable supply bin, not shown. The mold press is not shown, for clarity, however the bottom clamp plate 320 would be used to hold or clamp the mold to the not shown press.

Figure 4:
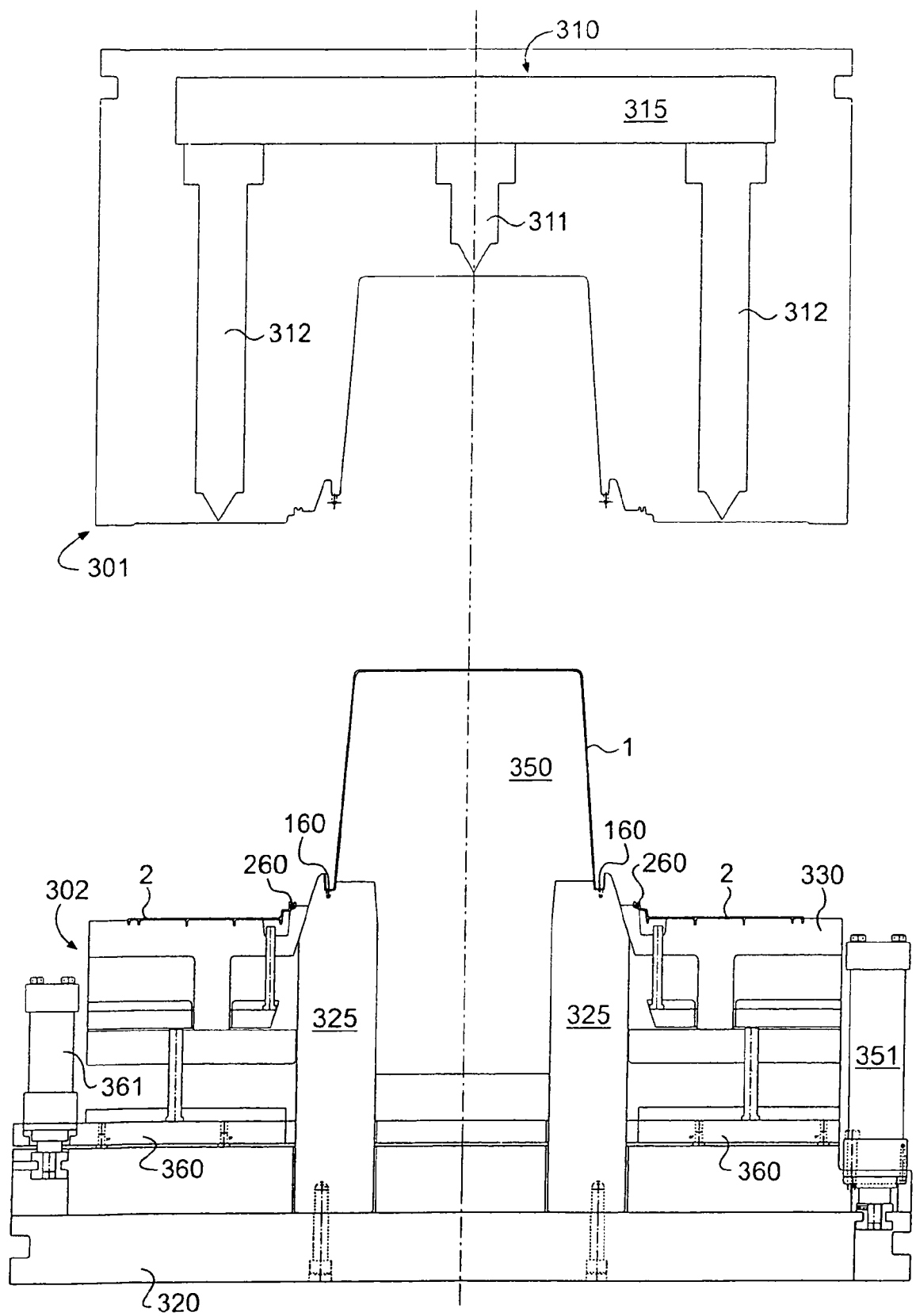
FIG. 4 is a sectional view through the width of the mold tool for molding the container and lids of FIG. 1 showing the core and cavity in the open position after molding the container and lids.

In FIG. 3, the mold is shown in the closed position in which the cavity and core parts of the mold are held together under pressure and the polypropylene or other melted material is injected into the mold to form the container 1 and both of the lids 2 on either side of the container at the same time. After injection of the melt through the melt flow system, the mold is opened as shown in FIG. 4, which means that the mold cavity is pulled away from the mold core. The molded parts are held on the mold core by friction immediately after the mold is opened, as shown in FIG. 4.

Figure 5:
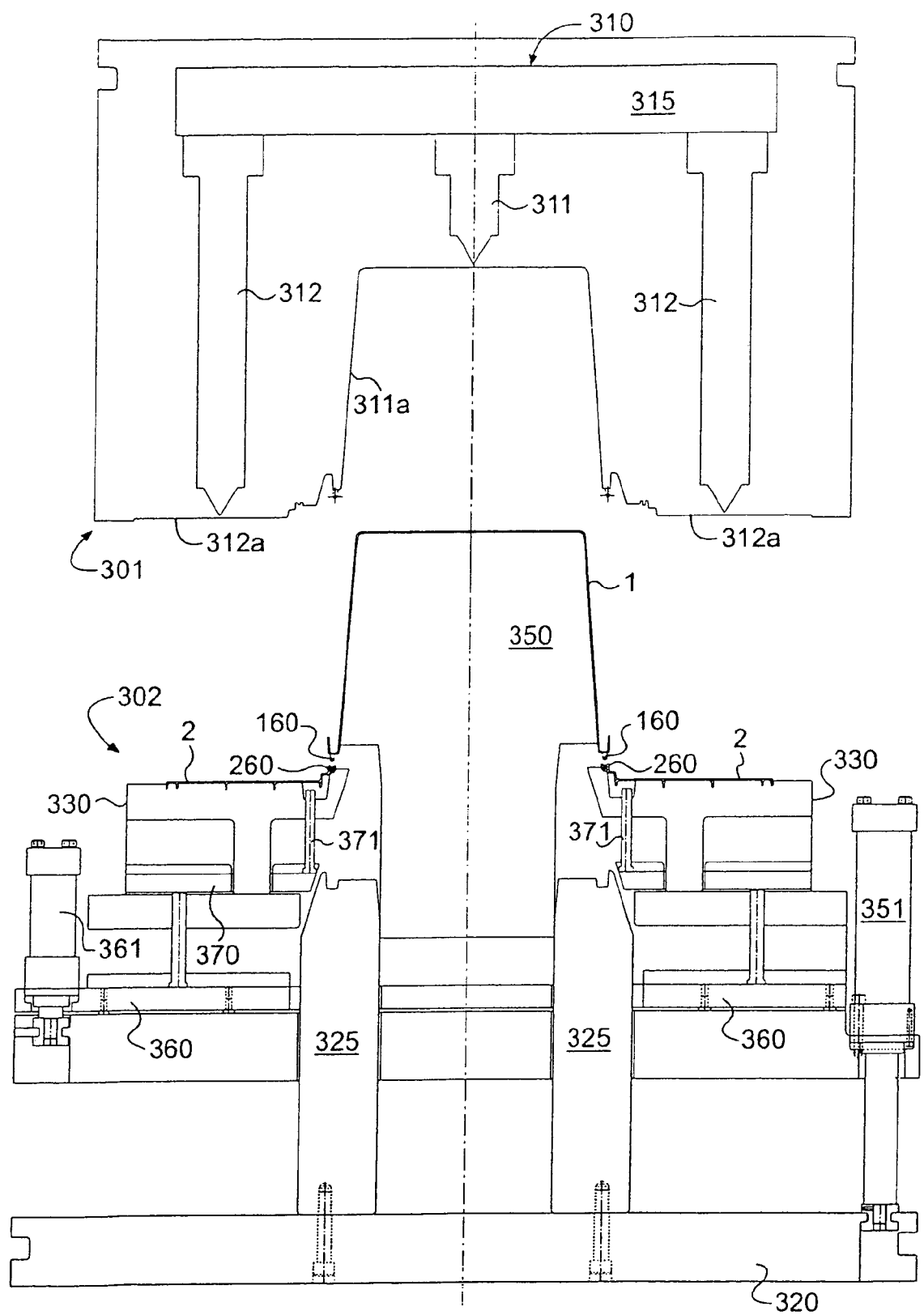
FIG. 5 is a sectional view through the width of the mold tool for molding the container and lids of FIG. 1 showing the core and cavity in the open position after molding the container and lids and after the lid cores have moved laterally to align the respective hinge parts of the container and lids.

In the next step of the sequence, as shown in FIG. 5, the first movement of the core half of the mold is begun. This is accomplished in a first core pull cycle, according to the preferred embodiment of the invention, and as a result, the core half is extended without moving the core wedges 325, which are bolted to the bottom clamp plate 320. The bottom clamp plate 320 is bolted to the mold press (not shown). As shown in FIG. 5, the lid core plates 330 move laterally inwardly in the first core pull cycle by the outward movement caused by the hydraulic cylinders 351 to a position in alignment with the container core 350. The movement of the lid core plates 330 is explained in greater detail with reference to FIGS. 26 and 27, hereinafter.

After the core pull movement aligns the lid core plates 330 so that the hinge parts (knuckles 261, 262 and end knuckles 265) molded in the lids are aligned with the hinge parts (pin segments 160 and terminal pins 290) molded on the top edge of the side walls of the container, in the position shown in FIG. 5, the second core pull cycle is performed which causes the ejector plates 360 to be moved by operation of the hydraulic cylinders 361. The ejector plates push on sub-plates 370 that advance ejector pins 371 that push on the molded lid part 2 at the hinge parts to force the hinge parts (knuckles) of the lid to snap fit onto the pin segments and terminal pin portions of the container. The ejector plates 360 do not directly push against the lid, but rather against the sub-plates so as to allow the lateral shifting of the sub-plates with respect to the ejector plates in the prior alignment step. Further, friction keeps the molded container on the mold core at this point to enable the lids to be forced onto the container without pushing the container off of the core. Undercuts in the core mold are provided as part of the design of the mold to ensure the proper amount of friction force for holding the container in place while this step is accomplished.

Figure 6:
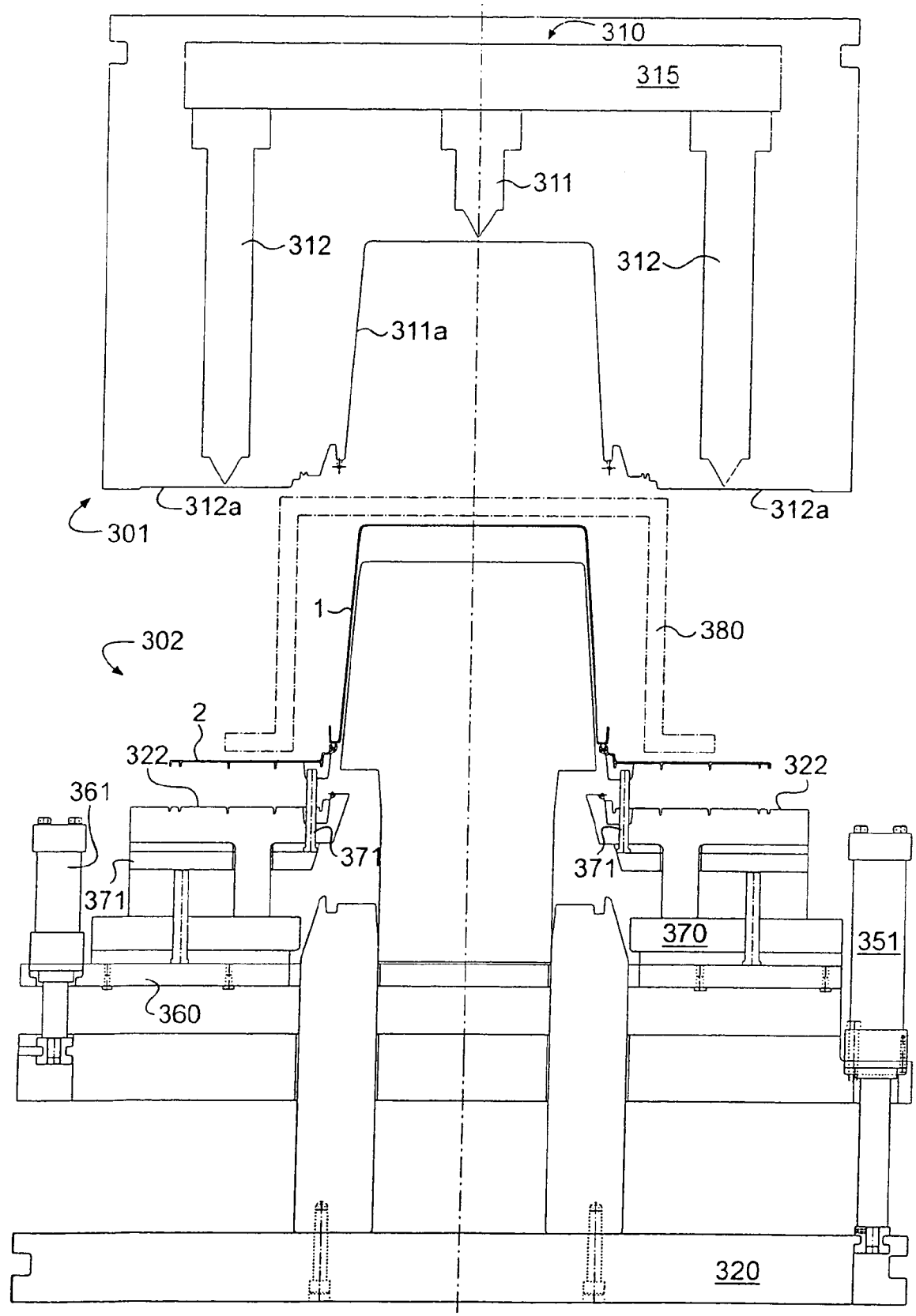
FIG. 6 is a sectional view through the width of the mold tool for molding the container and lids of FIG. 1 showing the core and cavity in the open position and showing the lids being ejected toward the container to fit the hinge parts of the lids into engagement with the hinge parts of the container.

FIG. 6 shows the result of executing the second pull cycle with the hydraulic cylinders 361 for the ejection plates 360 which pushes the ejector pins 371 against the lids (out of the lid cores) into engagement at the hinge lines with the container. After this assembly step, the container is fully ejected from container core 350 with the hinged lids attached. As shown schematically in FIG. 6, a robot arm 380 preferably having two suction cups (not shown) withdraws the ejected, molded product off of the core in the final step, after which the mold cavity and core parts are closed by the mold press and the injection molding cycle starts over. The robot arm withdraws the molded, assembled container with hinged lids from the mold press and stacks the container in a nested stack or otherwise delivers the container for further handling in the desired manner.

In order to press fit the lids onto the container, the hinge parts are molded so that the openings 264 of the knuckles 260 open in the direction facing the pin segments 160 with respect to the way in which the mold cavities and cores are laid out. That is, the openings extend upwardly and approximately perpendicularly to the midportion 20 of the lids. The hinge joints are strong and the lids are prevented from being easily removed by tampering when in the closed position. The details of the lids and the hinge knuckles are shown in FIGS. 7-17.

Figure 11:
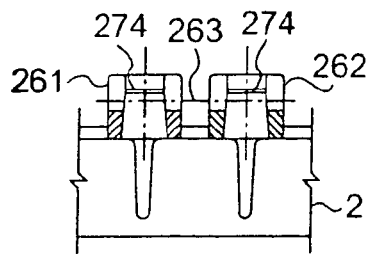
FIG. 11 is a sectional view taken along line 11-11 shown in FIG. 7.
Figure 13:
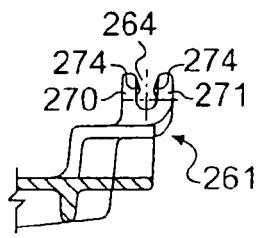
FIG. 13 is a sectional view taken along line 13-13 shown in FIG. 12.

FIG. 7 shows a plan view of one lid or half lid 2. The other lid or lid half is identical, although oriented oppositely when the lids are joined to the container so that the lids 2 engage one another as already explained. FIG. 8 is a side view of the lid shown in FIG. 7. FIG. 9 is a bottom view of the lid shown in FIG. 7. As shown in FIGS. 7, 8, 9 and 11, the hinge parts on the lid are in pairs of knuckles 260, individually indicated by reference numbers 261, 262. Each knuckle extends upwardly and outwardly from a portion of peripheral lid flange 28 that extends along the top edge of the lid. At each end of the hinge line are terminal end knuckles 265. The knuckles 261, 262 are separated by a space 263. Further details of each hinge knuckle are shown in FIG. 11, which is a sectional view taken along line 11-11 shown in FIG. 7; FIG. 13, which is a sectional view taken along line 13-13 shown in FIG. 12; and FIG. 16, which shows the detail of the hinge joint part in the area indicated by 16 in FIG. 14.

Figure 18:
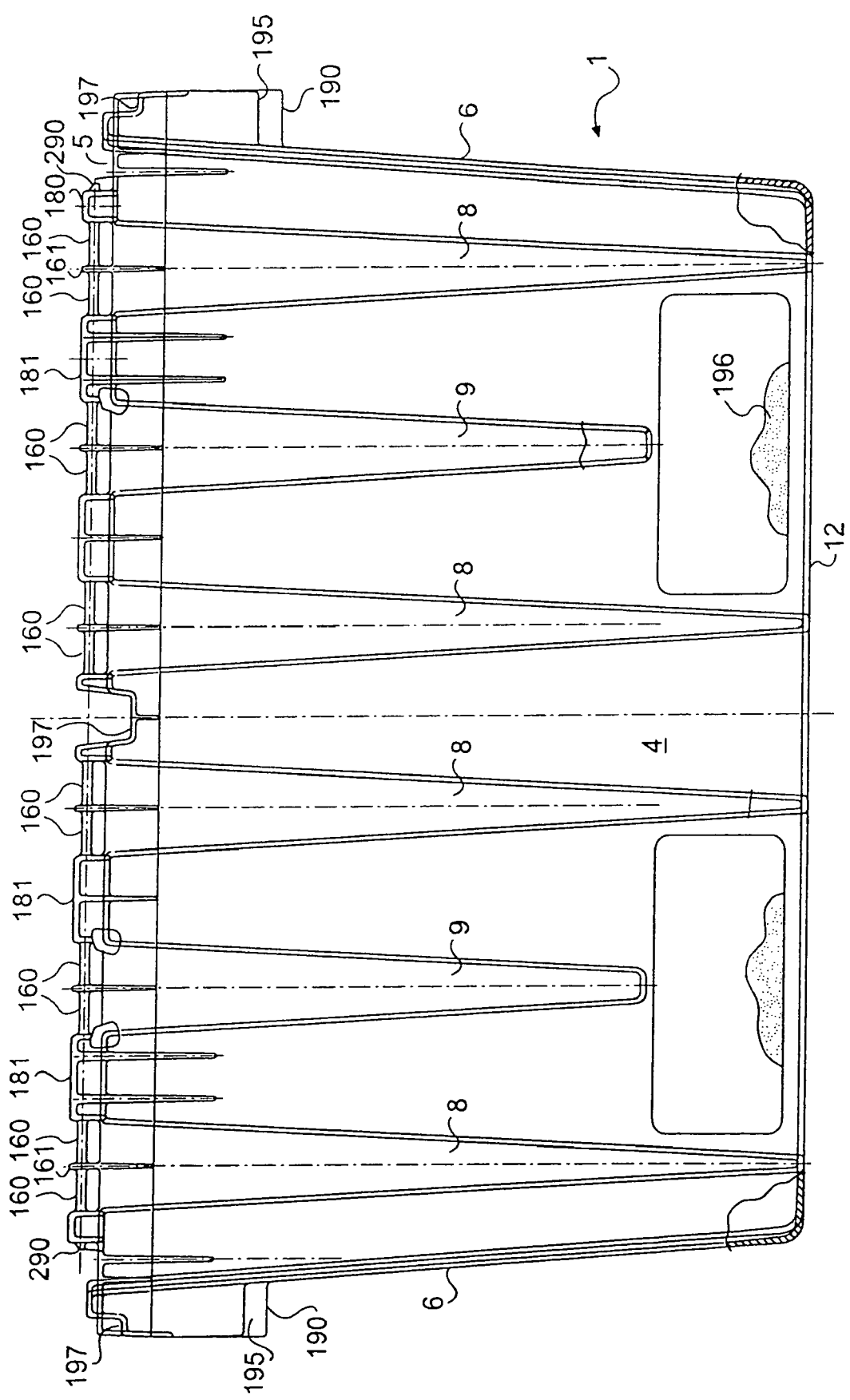
FIG. 18 a side view of the container shown in FIG. 1 without the lids attached.

In particular, each knuckle 261, 262 is generally U-shaped and formed of wall segments 270, 271. Each segment has an asymmetrical rib 274 protruding from the inside surface of the segment that faces the rib of the other segment. In the preferred embodiment, the top of the rib is ramped or curved away from the top edge of the segment to accept entry of a pin segment 160 of the container (FIG. 18). At its bottom edge, the rib is curved sharply or ramped steeply toward the inner surface of the segment to form a top part of a bearing portion 273 which is disposed at the bottom union of the segments, and which has a generally smooth rounded surface in which the pin is seated for relative rotation. Therefore, when the lids are pushed onto the container in the molding step described with respect to FIG. 6, the knuckles 261, 262 are forced open to accept the pin segments 160 so that the pin segments become seated in the bearing portions 273 of the knuckles to form the hinge joint between the lids and the container. This action is enhanced by forcing the lid knuckles on the pin segments just after the parts have been molded and the knuckle segments are flexible.

Figure 12:
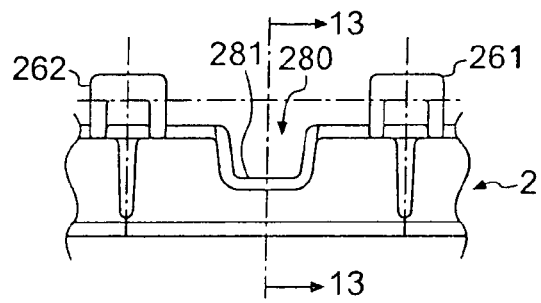
FIG. 12 is a partial side view taken in the direction of the arrows 12-12 shown in FIG. 9.

FIG. 12 is a partial side view taken in the direction of the arrows 12-12 shown in FIG. 9. The figure shows a banding channel 280, which has a bottom channel wall 281 that is coplanar with the midportion 20 of the lids, as shown in FIG. 17. The channel is located between two pairs of the knuckles. A total of three such banding channels are formed in each lid, as shown in FIG. 7.

Figure 19:
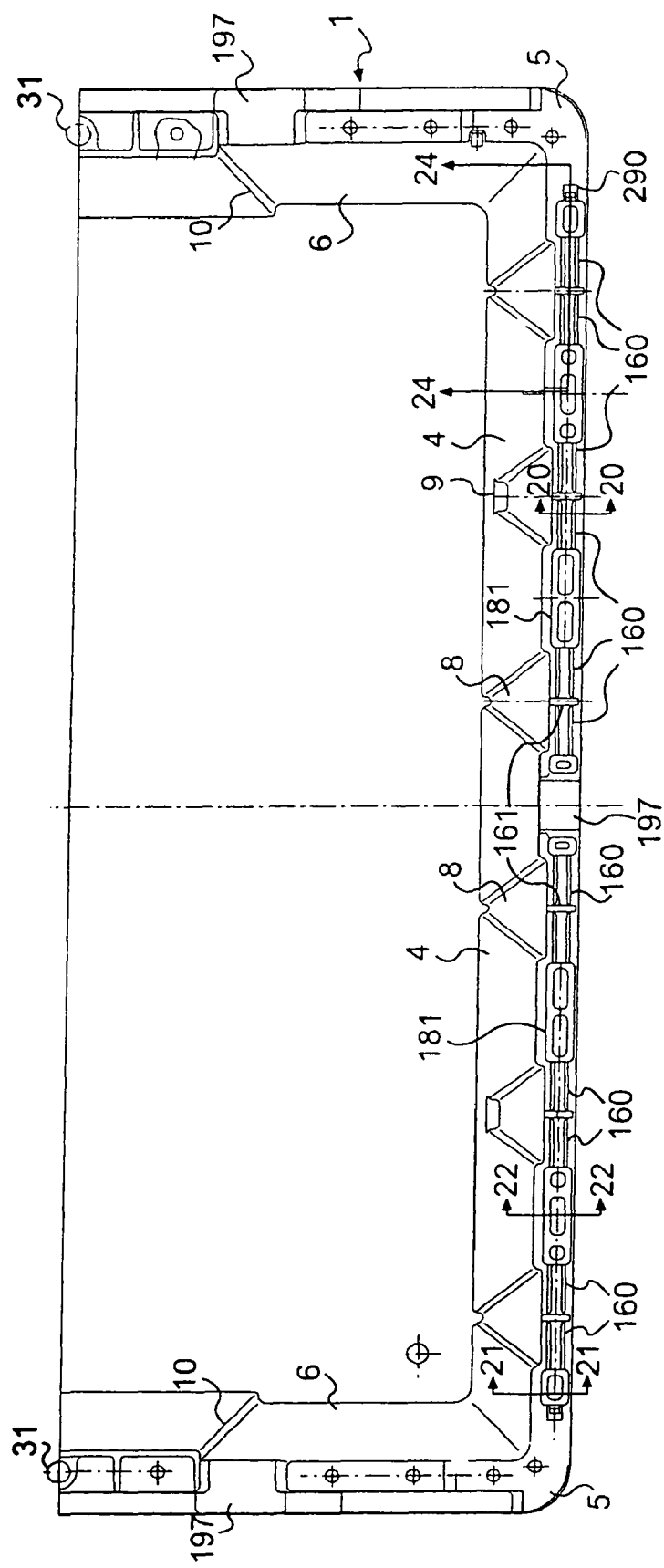
FIG. 19 is a top view of one half of the container shown in FIG. 18 with the other half being a mirror image of the half that is shown.
Figure 24:
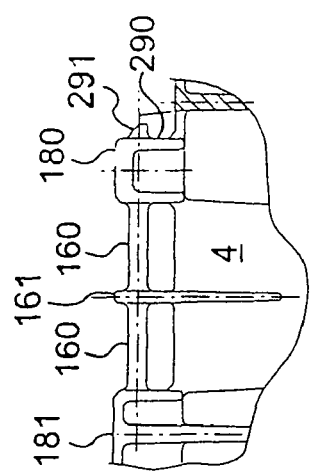
FIG. 24 is a sectional view taken along line 24-24 shown in FIG. 19.

FIGS. 18, 19 and 24 show the cantilevered terminal pins 290, which have a slanted or sloped end 291. The end knuckles 265 open downwardly, as shown in FIGS. 8, 10 and 17, in the opposite direction to the opening 264 of the knuckles 261, 262. As the end knuckles are pushed onto the terminal pins in the step shown in FIG. 6, the end knuckles engage the slanted or sloped ends 291 and deflect outwardly enabling them to cam past the ends of the terminal pin. Although the top surface 266 of the end knuckles 265 (FIG. 8) are shown to be at essentially right angles to the sides, forming a rounded edge further facilitates the camming action and ensures the end knuckles pass the terminal pins so that the terminal pins 290 become seated in the bearing recesses 267. Therefore, it is preferred to mold the top of the end knuckles more rounded than is shown where the slanted edge of the terminal pin 291 engages the end knuckles to aid in the assembly of the hinge joint. Accordingly, the end of the hinge joint that is formed between each lid 2 and the container includes a captured terminal pin 290 that is seated within a bearing recess 267, as shown in FIG. 10.

FIGS. 18-22 and 24 show the details of the container 1. Pin segments 160 are formed on the top edge 5 of the side walls 4. The pin segments are divided into two sections, separated by an upstanding flange 161 that is accommodated by the space 263 (FIG. 11) formed between adjacent hinge knuckles 261, 262. The pin segments 160 are supported at each end, therefore, to ensure adequate strength in the hinge joint. FIG. 20 is a sectional view taken along line 20-20 shown in FIG. 19 and shows the side view of the upstanding flange. FIG. 21 is a sectional view taken along line 21-21 shown in FIG. 19 showing a narrow end portion 180 of the curved upper flange of the side walls 4. A wide section 181 of the curved upper flange is shown in FIG. 22 (and FIG. 2), which is a sectional view taken along line 22-22 shown in FIG. 19.

FIG. 18 shows nesting stops 190 on the end walls 6 and the handles 195. Areas 196 on the sidewalls are optionally textured to enable the application of pressure sensitive adhesive labels, if desired. As shown in FIGS. 18 and 19, the flange at the top of the side and end walls has recesses 197 that align with the banding channels 280 in the lid.

Figure 25A:
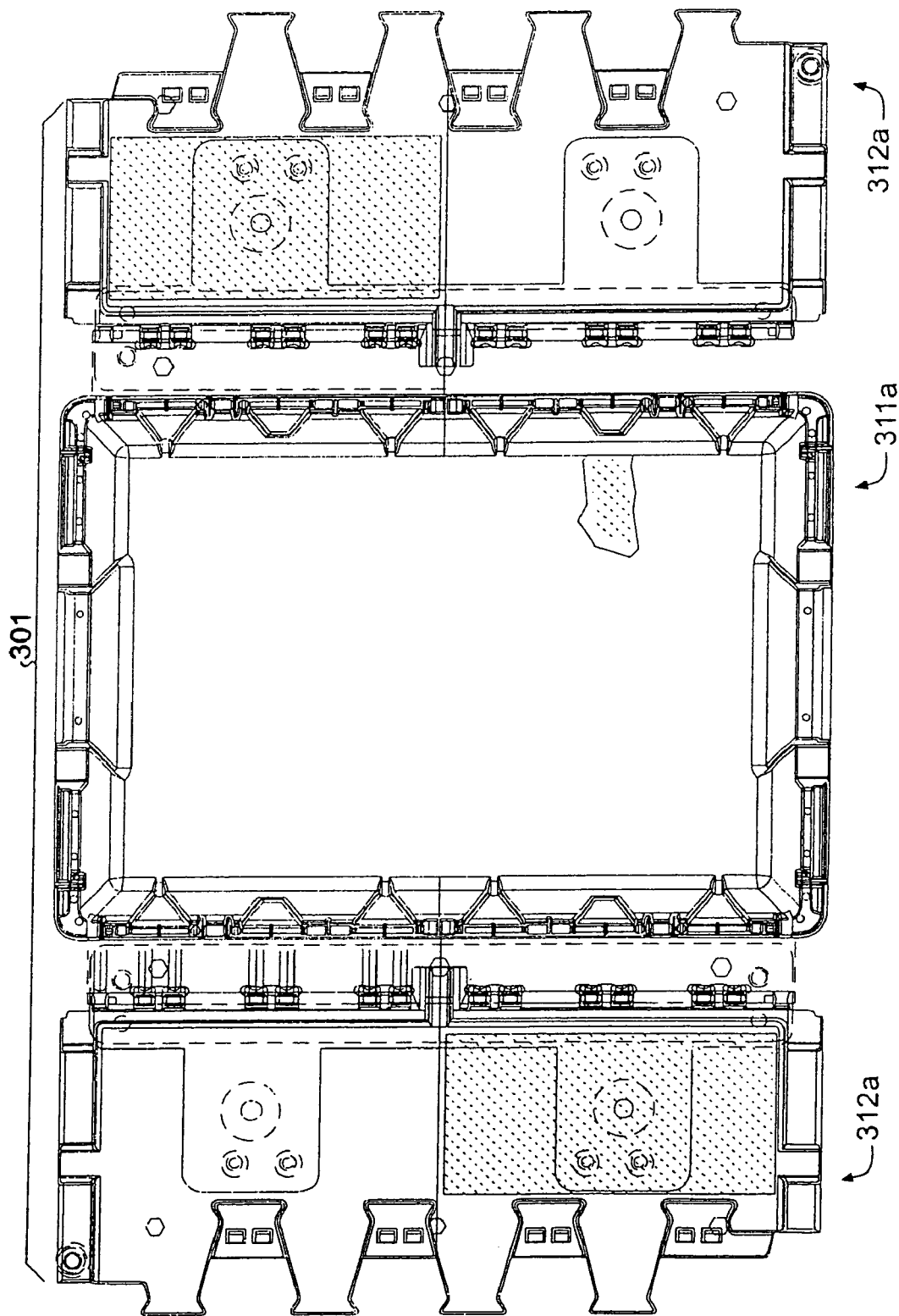
FIG. 25A is a plan view of the cavity part of the mold showing the three cavities for molding the container and lids of the preferred embodiment of the invention.
Figure 25B:
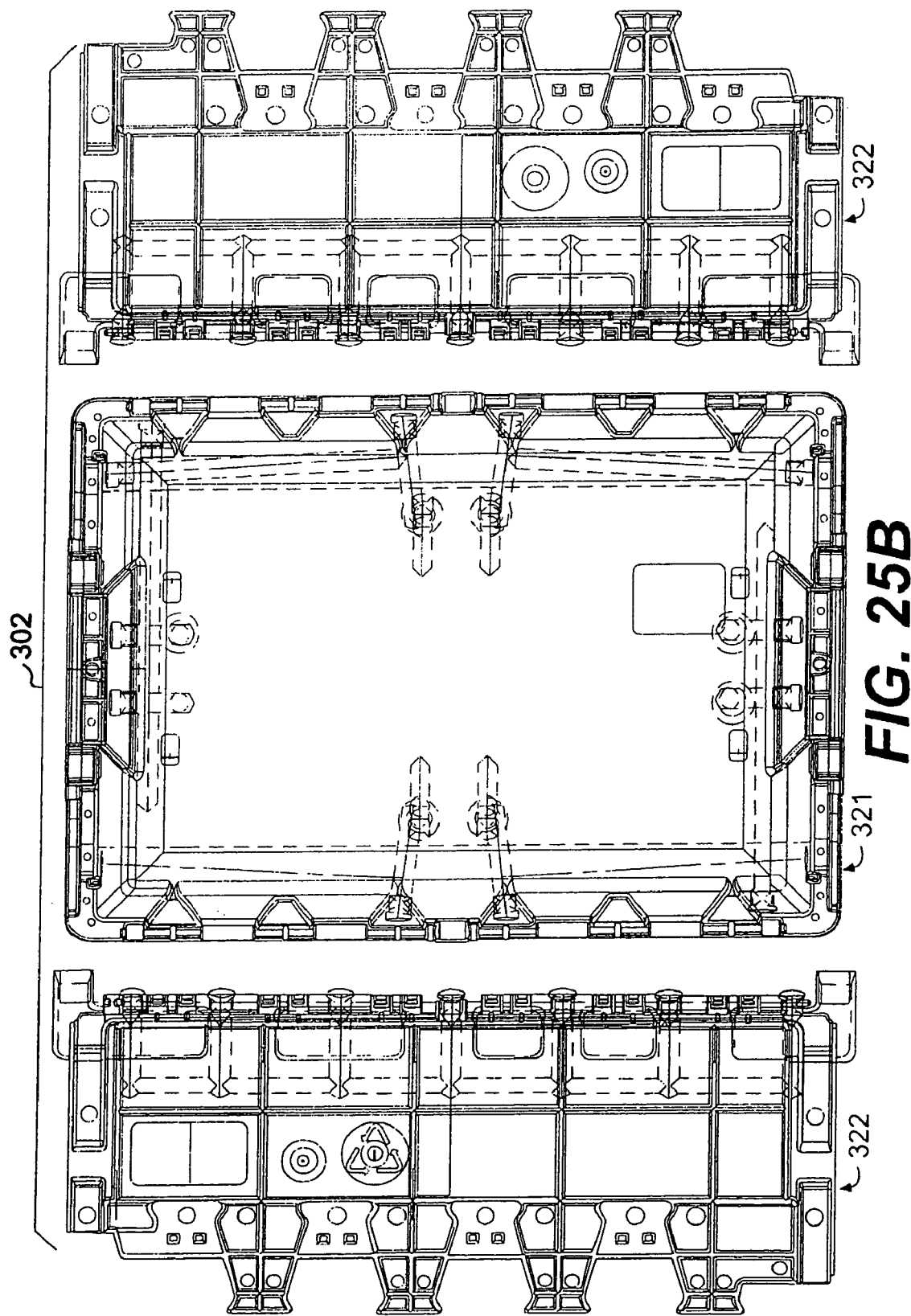
FIG. 25B is a plan view of the core part of the mold showing the three core plates for molding the container and lids of the preferred embodiment of the invention in conjunction with the cavity parts shown in FIG. 24.

FIG. 25A is a plan view of the cavity part of the mold showing the cavity 311a for molding the container and the cavities 312a for molding the lids of the preferred embodiment of the invention. FIG. 25B is a plan view of the core part of the mold showing the core 321 for the container and the cores 322 for the lids according to the preferred embodiment of the invention. The core for the container is flanked by the cores for the lids and the spacing between the cores/cavities for the container and lids is as close as practical. When the cavity and core parts of the mold are pressed together, the container and lids can be injection molded using the melt-flow system shown schematically in FIG. 4.

In FIG. 5, the lid core plates are shown to be shifted inwardly from their position when the parts are molded, according to a preferred embodiment. The manner in which these plates are shifted with respect to the container core is explained with respect to FIGS. 26A-D and 27.

In particular, FIG. 26A schematically shows that the lid core plates 330 are mounted to shift laterally inwardly as they are moved outwardly with the ejector sub-plates 370, ejector plates 360 and container core 350, i.e. away from the bottom clamping plate 320 in the first pull cycle. Specifically, the lid core plates 330 are able to slide laterally inwardly as they move outwardly along the stationary core wedges 325 as a result of a sliding connection of the lid core plates 330 to stationary structure fixed to the bottom clamp plate 320 or core wedges through gibbs 368 (generally), including "T" gibbs 369 and "L" gibbs 372, as shown in detail in the end views of FIGS. 26C and 26D. The core wedges 325 have an angled upper end surface 326 having the same angle as the path of travel of the lid core plates at either side of the container core 350. Additionally, a combination of "T" gibbs and "L" gibbs are used in the mounting of the container core to enable the straight outward movement of the core, as shown in detail in the end view of FIG. 26B.

Figure 27:
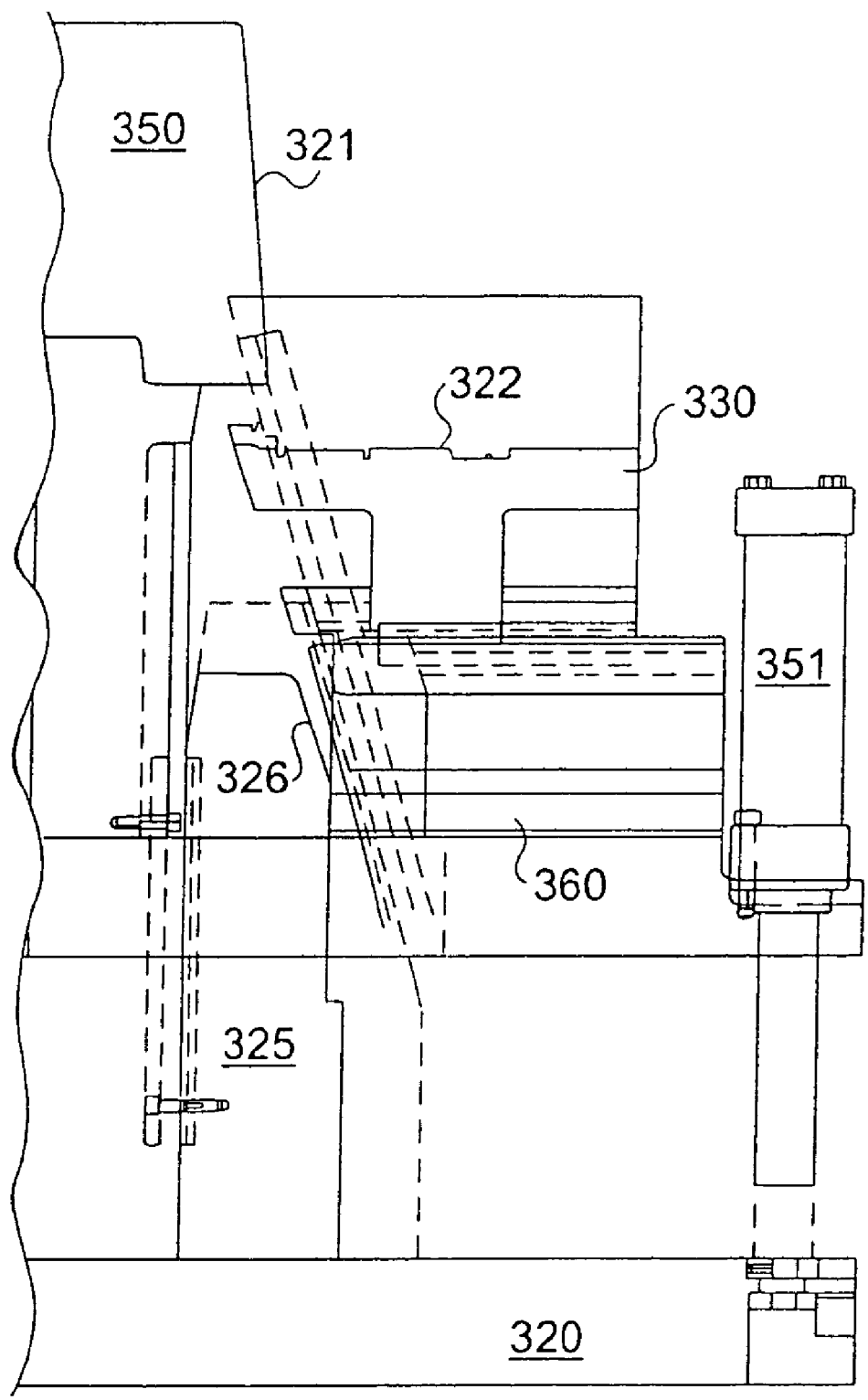
FIG. 27 shows a partial end view similar to FIG. 26A of the mold which shows the position of the mold core after movement of the lid core plates with respect to the container core.

FIG. 27 shows a partial end view of the mold after the first pull cycle in which the container mold core has moved outwardly with respect to the bottom clamp plate 320 and the lid core plates 330 have moved inwardly with respect to the container core. As shown, the lid core plates have been able to slide laterally inwardly as they were moved outwardly by the hydraulic cylinder 351 in the first pull cycle.

While preferred embodiments have been set forth with specific details, further embodiments, modifications and variations are contemplated according to the broader aspects of the present invention. In particular, although a container having two hinged lids is disclosed, a container having one hinged lid is also contemplated by the present invention since the savings in manual labor can be advantageously gained in the same manner to provide a container with one hinged lid that is assembled in the molding process.

Further, the container may be of a knock down type having four walls that are hinged to a base in which each of the walls is pressed or snap fitted into the base using similar corresponding hinge structure on the base and walls as disclosed herein. Moreover, the invention is suitable for use with any type of single sided or multi-sided structure wherein the sides are able to be press fit into a base, whether or not the sides are hinged for movement.

The invention claimed is:

1. In a method of molding and assembling a container having a lid connected thereto by the steps of injecting a molten plastic liquid into a mold to form a container body having an open top and to form at least one lid situated adjacent one edge of the open top, the one edge of the container body being formed with hinge parts along a length thereof and the lid being formed with hinge parts along an edge thereof, opening the mold by separating a mold cavity portion of the mold from a mold core portion of the mold so that the container body and the lid are supported by the mold core portion, moving a first part of the mold core portion so that the connecting parts on the lid are aligned with the connecting parts on the one edge of the container body and pushing the lid away from the first part of the mold core portion towards the container body on a second part of the mold core portion until the connecting parts on the lid are engaged with the connecting parts on the one edge of the container body to connect the lid to the container body, the improvement which comprises:

in the step of injecting a molten plastic liquid into a mold, constructing the mold so that the hinge parts formed along the one edge of the container body are formed as pin segments along a hinge line and the hinge parts formed along the edge of the lid are formed as generally U-shaped knuckles along a hinge line, with each knuckle having opposed side walls which form a slot having an opening at one end and a bearing portion at an opposite end and which opens upwardly with respect to a top surface of the lid and wherein the opposed side walls of the slots of a least certain of said knuckles have ribs protruding inwardly from the side walls between said opening and said bearing portion to retain corresponding pin segments of the container body in said bearing portions of said slots when the lid is connected to the container body, and constructing the mold so that an end knuckle is formed at each end of said hinge line on the lid, each said end knuckle having an opening on an inside end thereof facing a mid portion of the lid, and a corresponding cantilever in extending outwardly at each end of said hinge line on the container body is formed whereby said openings in said end knuckles capture said corresponding respective cantilever pins when the lid is connected to the container body; and in the step of pushing the lid away from the first core portion, the lid is pushed towards the container body until the slots in the knuckles on the lid are engaged with the pin segments on the one edge of the container body and the openings in the end knuckles capture the cantilever pins to rotatably connect the lid to the container body whereby when the lid is rotated to a closed position, the slots face upwardly with respect to the top surface of the lid and the pin segments engage the bottoms of the slots to prevent the lid from being pulled off the container.

2. A method of molding and assembling a container according to claim 1 which further comprises forming said pin segments and said cantilever pins on each of two opposite edges of the open top of the container, forming a lid adjacent each of the opposite edges with each lid being formed with generally U-shaped knuckles having slots which open upwardly with respect to the top surface of the lid and an end knuckle with an opening at each end of the hinge line and wherein both lids are pushed towards the container body until the slots in the knuckles on the lids are engaged with the pin segments and the cantilever pins are captured in the openings of the end knuckles on both opposite edges of the open top of the container body.

3. A method of molding and assembling a container according to claim 1 which further comprises forming each rib so that a top of each rib is ramped away from a top edge of a wall segment to accept entry of a pin segment and a bottom edge of each rib is ramped toward an inner surface of the wall segment to form a top part of the bearing portion which maintains a pin segment in place when the pin segment is seated in the bottom bearing portion of the knuckle.

* * * * *